(12) United States Patent
Nuttall et al.

(10) Patent No.: US 7,829,823 B2
(45) Date of Patent: Nov. 9, 2010

(54) HEATED FOOD STORAGE AND DISPLAY CABINET

(75) Inventors: Alan David Nuttall, Hinckley (GB); Michael James Steele, Sapcote (GB); Gareth Richardson, Hinckley (GB)

(73) Assignee: Alan Nuttall Limited, Hinckley, Leicestershire (GB)

( * ) Notice: Subject to any disclaimer, the term of this patent is extended or adjusted under 35 U.S.C. 154(b) by 88 days.

(21) Appl. No.: 11/911,885

(22) PCT Filed: Apr. 21, 2006

(86) PCT No.: PCT/GB2006/001469

§ 371 (c)(1),
(2), (4) Date: Jul. 23, 2008

(87) PCT Pub. No.: WO2006/111767

PCT Pub. Date: Oct. 26, 2006

(65) Prior Publication Data

US 2008/0284296 A1    Nov. 20, 2008

(30) Foreign Application Priority Data

Apr. 22, 2005    (GB) ............................... 50508204.5

(51) Int. Cl.
*H05B 1/00*    (2006.01)
(52) U.S. Cl. ...................... 219/214; 219/385; 219/400; 222/146.5
(58) Field of Classification Search ................. 219/214, 219/385, 400; 222/146.5
See application file for complete search history.

(56) References Cited

U.S. PATENT DOCUMENTS

| 5,558,010 | A | * | 9/1996 | Shelton ........................ 99/468 |
| 6,742,344 | B2 | * | 6/2004 | Vormedal ....................... 62/89 |
| 2002/0005686 | A1 | * | 1/2002 | Nuttall et al. ............... 312/236 |
| 2004/0177634 | A1 | | 9/2004 | Yamazaki et al. |
| 2004/0226932 | A1 | | 11/2004 | Flinn |

FOREIGN PATENT DOCUMENTS

| GB | 1000343 | 8/1965 |
| WO | WO03099077 | 12/2003 |

\* cited by examiner

*Primary Examiner*—Tu B Hoang
*Assistant Examiner*—Vinod D Patel
(74) *Attorney, Agent, or Firm*—Downs Rachlin Martin PLLC

(57) ABSTRACT

A heated food storage and display cabinet (10) comprises an open fronted enclosed chamber (30) within which packs of food can be stored, the cabinet (10) including flow inducing means (52) and heater means (54) arranged in an upper region thereof, the flow inducing means being operable to draw air from an upper portion of the enclosed chamber (30), direct the air over the heater means (54) to heat the air and subsequently urge the heated air down the rear wall (18) of the chamber (30) and across the floor (22) of the chamber (30) towards the open front of the chamber (30), said heated air being subsequently directed upwardly and rearwardly across the open front of the chamber (30) by an airflow direction member (78) of the chamber (30) to provide a heated air curtain (70) across the open front of the chamber, wherein a portion of the heated air (64,68) passes into the chamber (30) as said heated air moves down the rear wall (18) and across the floor (22) so as to pass over and around packs of food stored therein.

18 Claims, 5 Drawing Sheets

HEATED FOOD STORAGE AND DISPLAY CABINET

The present invention relates to a heated food storage and display cabinet and is primarily concerned with a heated food storage and display cabinet for use in supermarkets, and mixed purpose retail outlets, such as convenience stores, where heated food is made available for purchase.

Changes in working patterns have lead to changes in eating habits, particularly with respect to what might be called traditional meal times where a family group sits around a table and eats home cooked food. It is now becoming increasingly commonplace for convenience meals to be eaten of an evening while watching television from an easy chair. This change has, in turn, lead to an increase in takeaway food outlets where a person can collect a pre-cooked meal or constituent portion to eat at home or on the move.

For some time now, supermarkets have offered a range of prepared food which can be taken home, heated or cooked, and then eaten. However, there is now increasing competition from takeaway food outlets which supermarkets wish to address by supplying hot ready cooked meals and snack items themselves. One of the problems faced by supermarkets is how to keep such food hot whilst making it readily accessible to customers and it is an object of the present invention to provide a cabinet which will be suitable for this purpose. A further object of the present invention is to provide a heated food storage cabinet which enables heated air to flow over packs of food contained therein.

According to the present invention there is provided a heated food storage and display cabinet comprising an open fronted enclosed chamber within which packs of food can be stored, the cabinet including flow inducing means and heater means arranged in an upper region thereof, the flow inducing means being operable to draw air from an upper portion of the enclosed chamber, direct the air over the heater means to heat the air and subsequently urge the heated air down the rear wall of the chamber and across the floor of the chamber towards the open front of the chamber, said heated air being subsequently directed upwardly and rearwardly across the open front of the chamber by an airflow direction member of the chamber to provide a heated air curtain across the open front of the chamber, wherein a portion of the heated air passes into the chamber as said heated air moves down the rear wall and across the floor so as to pass over and around packs of food stored therein The airflow direction member of the cabinet ensures that the flow of heated air driven by the flow inducing means is not ejected out through the open front of the cabinet. The airflow redirection member preferably extends across the cabinet between opposing side walls of the cabinet. The airflow redirection member is preferably planar and is inclined inwardly with respect to the chamber. The airflow redirection member may be inclined inwardly with respect to the chamber at an angle of between 10 to 20 degrees to the vertical. Preferably, the airflow redirection member is inclined ant an angle of around 15 degrees to the vertical.

The flow inducing means preferably comprise a pair of fans situated in an upper portion of the chamber. The fans are preferably provided in a side by side arrangement. The heater means are positioned at the fan outlets. The heater means may preferably comprise one or more electric heating elements. The fans are operable independently of one another and as such may be operated at slightly different speeds so as to ensure a uniform distribution of air around the cabinet.

In a preferred embodiment the fans and heater means are provided in a fan chamber situated in an upper portion of the cabinet chamber. The fan chamber is provided with an inlet arranged to receive air from within the open fronted enclosed chamber of the cabinet and an outlet arranged to direct heated air towards the rear wall of the enclosed chamber. The inlet may comprise a plurality of apertures aligned with the inlet to the fans. The apertures may comprise a plurality of louvered slots. The fan chamber may be separated from the cabinet chamber by a panel extending between opposed sides of the cabinet chamber. The panel is preferably movable so a to permit access to the fan chamber. The panel may be hinged to the cabinet.

The cabinet chamber is preferably provided with one or more food pack support means. The food pack support means may comprise one or more shelves. Each shelf may comprise a pair of spaced brackets having a food pack support member extending therebetween. The support member may be provided with a apertures therethrough. In a preferred embodiment the support member may be inclinable. As such the support member may be set at desired inclination. The support member is preferably provided with an airflow redirection means along its forward edge. The airflow redirection means may be defined by a tab or curved surface extending along the forward edge of the support member. The airflow redirection means may be incorporated into a display member provided on the forward edge of the support member.

According to a further aspect of the present invention there is provided a method of storing and displaying heated food in an open fronted cabinet, the method comprising providing an open fronted enclosed chamber within which packs of food can be stored, providing flow inducing means and heater means arranged in an upper region thereof, operating said the flow inducing means to draw air from an upper portion of the enclosed chamber, direct the air over the heater means to heat the air and subsequently urge the heated air down the rear wall of the chamber and across the floor of the chamber towards the open front of the chamber, providing an airflow direction member to direct said heated air upwardly and rearwardly across the open front of the chamber to provide a heated air curtain across the open front of the chamber, and causing a portion of the heated air to pass into the chamber as said heated air moves down the rear wall and across the floor so as to pass over and around packs of food stored therein.

An embodiment of the present invention will now be described with reference to the accompanying drawings in which.

Figure 1:
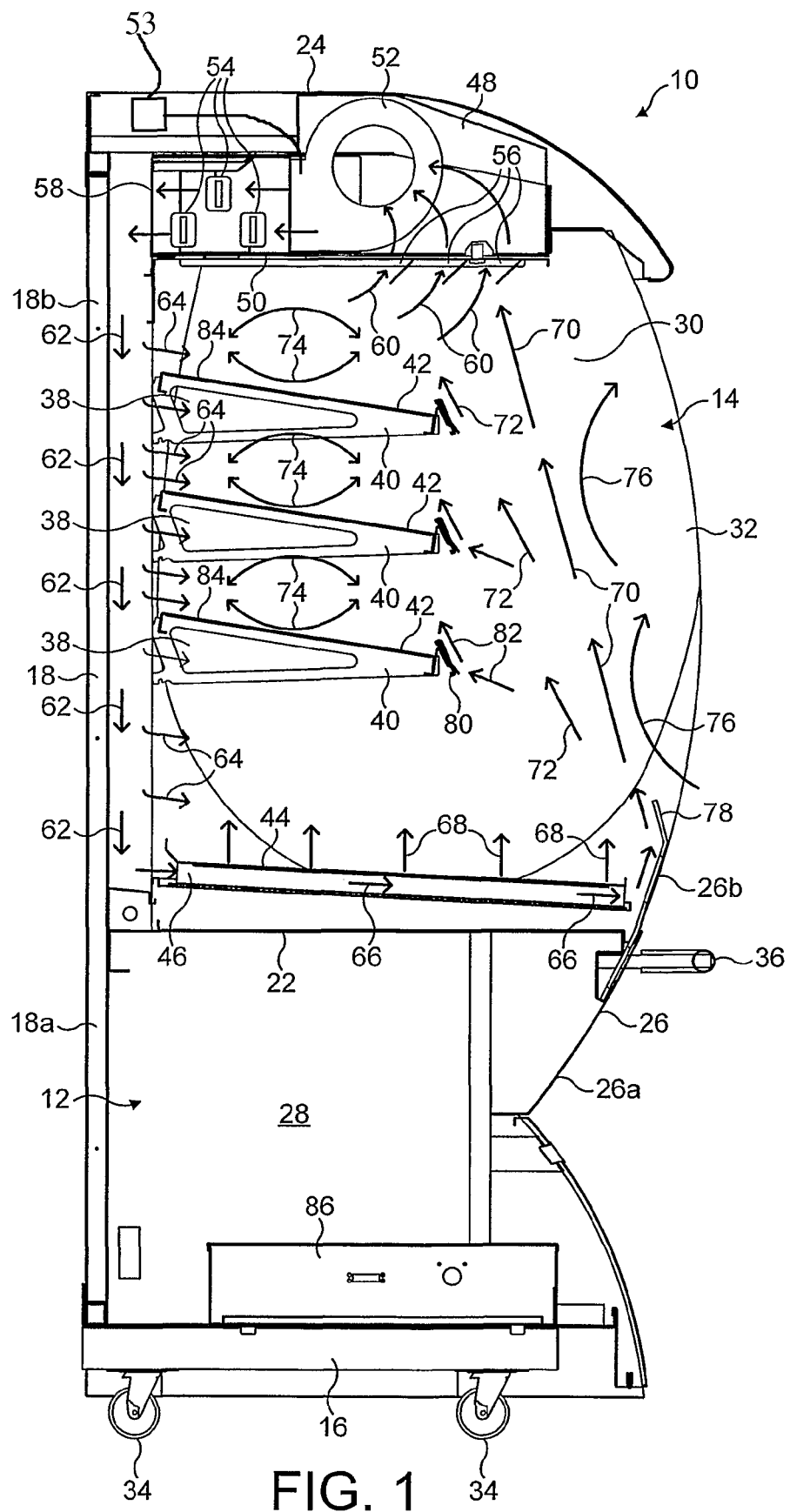
FIG. 1 shows a front view of a cabinet according to the present invention.
Figure 2:
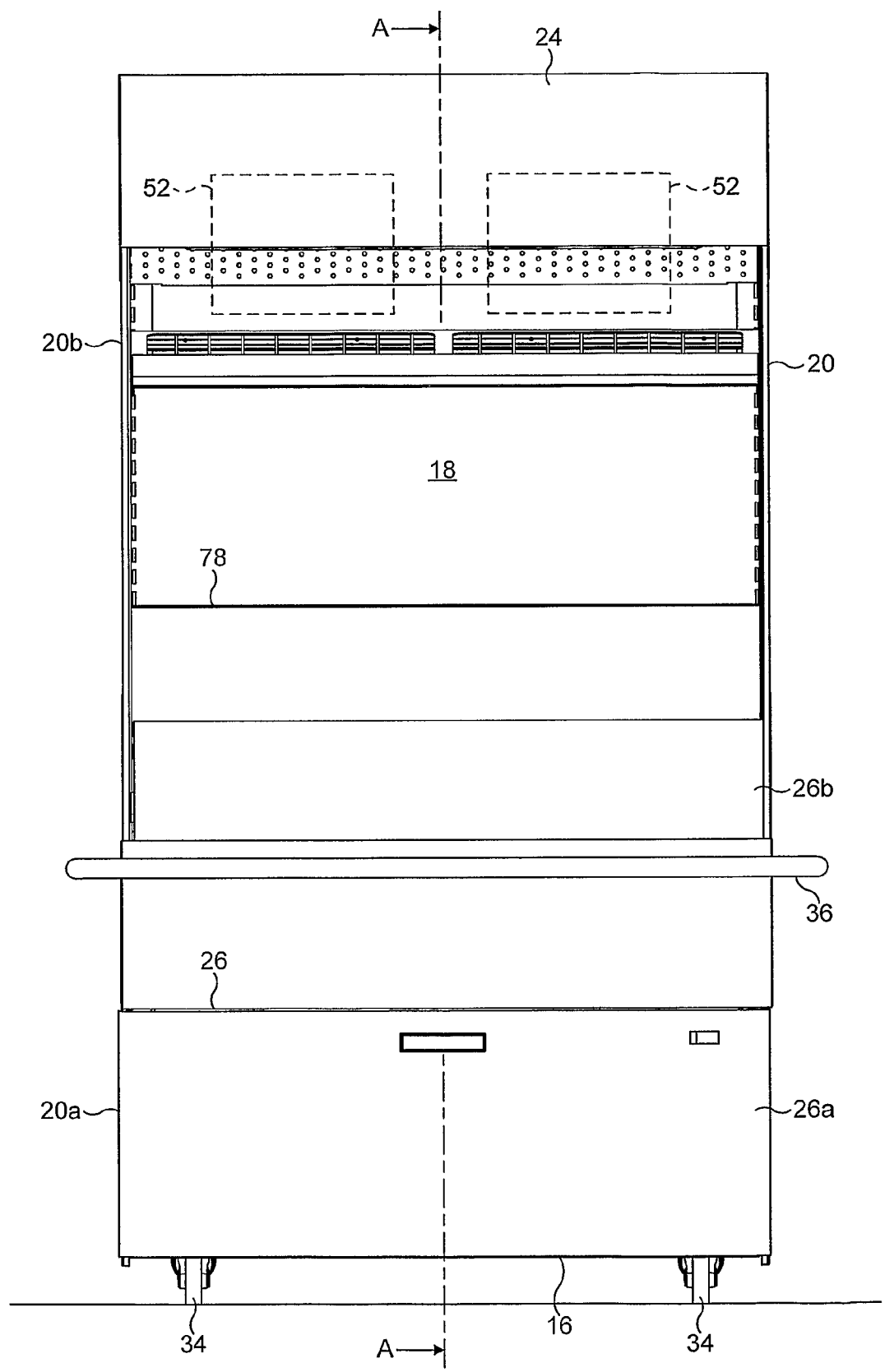
FIG. 2 shows a cross-sectional side view if the cabinet of FIG. 1 as indicated by arrows A-A of FIG. 1.

Referring firstly to FIGS. 1 and 2 there is shown a cabinet generally designated 10. The cabinet 10 comprises a base portion 12 and a product display portion 14 above the base portion 12. The cabinet 10 includes a floor 16, a rear wall 18, opposed side walls 20, a base wall 22 and a top wall 24 and a front wall 26. The base and product display portions 12, 14 are delimited by the base wall 22 such that the base portion 12 is defined by the floor 16, the base wall 22 and lower portions of the rear wall 18a, side walls 20a and front wall 26a. The walls 18a,20a,22 and 26a and floor 16 of the base portion 12 define a substantially enclosed space 28 The product display portion 14 is defined base wall 22, top wall 24 an upper portions of the rear wall 18*b*, side walls 20*b* and front wall 26*b*. The walls 18*b*,20*b*,22,24 and 26*b* of the product display portion 14 define partially enclosed space 30, hereinafter referred to as the heated space 30. The heated space 30 is accessible through the open front 32 of the cabinet 10 defined between the top wall 24, and upper portions of the side and front walls 20*b*, 26*b*. The upper portions of the side walls 20*b* are transparent and thus allow the interior of the heated space 30 to viewed from either side of the cabinet 10.

The underside of the floor 16 is provided with casters 34 to enable the cabinet 10 to be easily moved over the surface, such as the floor of a retail premises, upon which the cabinet 10 is provided. One or more of the casters 34 may be lockable so as to enable the cabinet 10 to remain at a desired location. The lower portion 26*a* of the front wall is provided with a bumper rail 36 which extends across the front of the cabinet 10. The bumper rail 36 is provided to protect the cabinet from impact damage from, for example, shopping arts or other instore product transportation equipment. The bumper rail 36 also can be used as a handle when manoeuvring the cabinet 10.

The heated space 30 is provided with shelves 38 which extend across the heated space 30 between the side walls 20. Each shelf 38 comprises a pair of brackets 40 which are spanned by a product support member 42 formed from a substantially planer portion of plastic coated wire mesh. It will be appreciated that the product support members 42 may have configurations other than that of wire mesh, and the configuration of a given product support member 42 will depend at least in part in the nature of the food pack it is intended to support. For example, in an alternative configuration the support member 42 may be defined by sheet of metal provided with or without perforations. The brackets 40 are mounted to support members provided to the rear of the heated space 30. The support members are positioned forward of the rear wall 18 of the cabinet 10 so that the rear edges of the bracket 40 and support members 42 are spaced from the rear wall 18.

In the embodiment shown the cabinet 10 is provided with three shelves 38. It will be appreciated that the cabinet 10 may be provided with a greater or lesser number of shelves 38 depending upon the size and nature of the food packages which the cabinet 10 is to receive and display. The base wall 22 is provided with a tray 44 upon which food packages may be placed. The tray 44 is positioned above the base wall 22 so as to provide a space 46 therebelow. The tray 44 is also perforated.

In an upper part of the product display portion 14 there is provided a fan chamber 48 which is defined between the top wall 24, the side walls 20 and a soffit panel 50. Within the fan chamber 48 there are provided two blower fans 52 and a plurality of electric heater elements 54. In the embodiment shown, the fans 52 are each double inlet blower fans. The soffit panel 50 is hinged to the cabinet 10 to permit easy access to the fans 52 and heater elements 54. The fan chamber 48 is provided with inlets defined by a plurality of louvres 56 provided in an forward part of the soffit panel 50 and an outlet 58 which faces the top of the rear wall 18. The heater elements 54 are arranged between the delivery outlet of the fans 52 and the chamber outlet 58 so as to heat air ejected from the fans 52.

Figure 3:
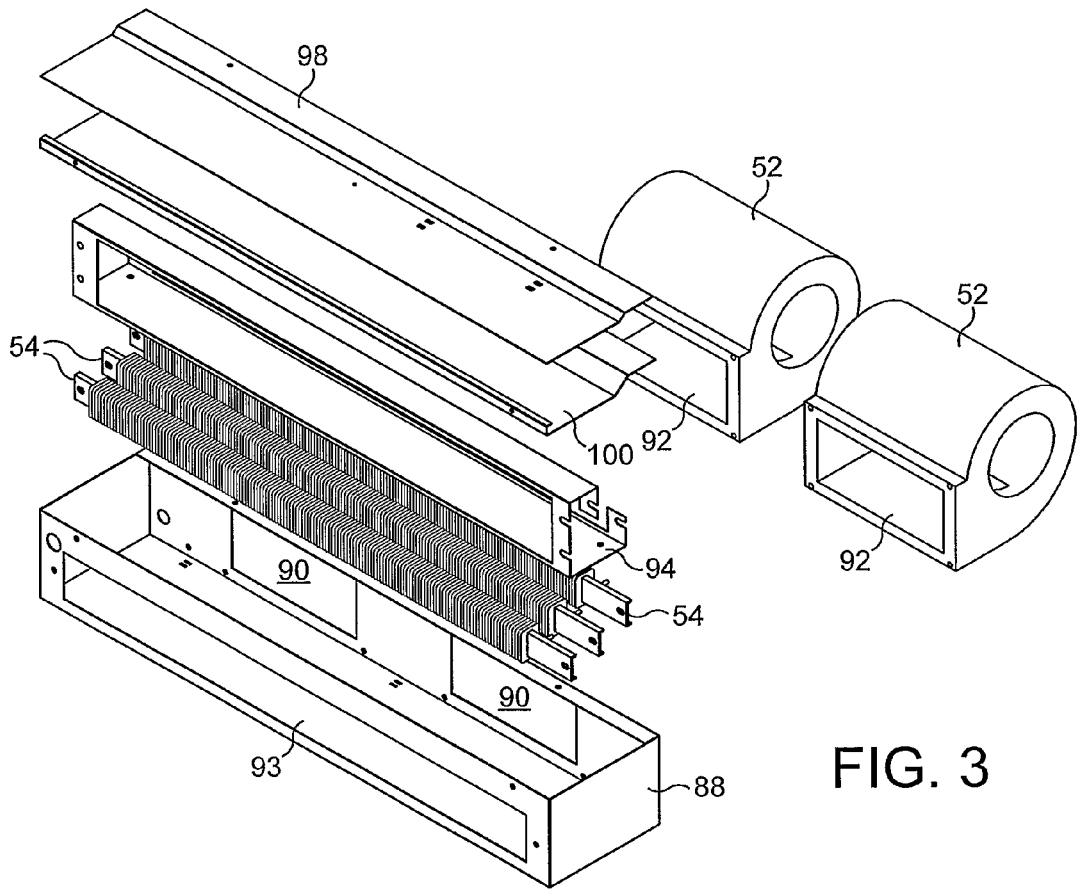
FIG. 3 shows an exploded view of the fan and heater arrangement of the cabinet.
Figure 4:
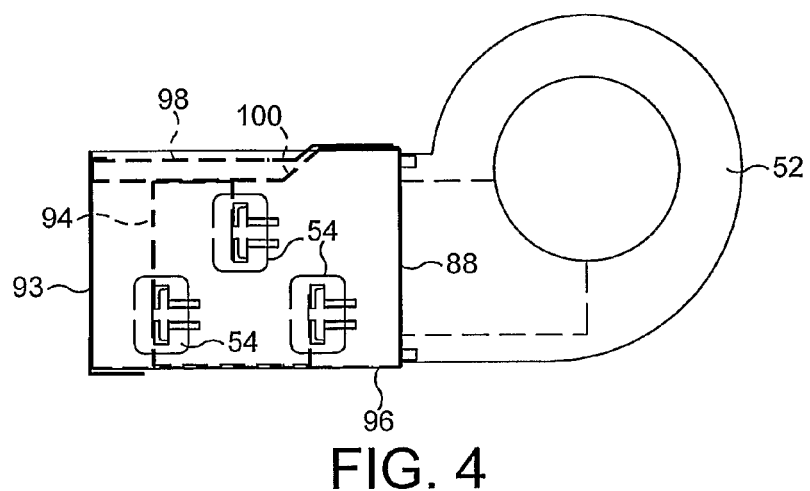
FIG. 4 shows a side view of the heater arrangement of FIG. 3.

The arrangement of the fans 52 and the heater elements 54 is illustrated in greater detail in FIGS. 3 and 4. The fans 52 are mounted in a side by side arrangement to a heater box 88. The heater box 88 is provided with respective inlet apertures 90 to which the discharge outlets 92 of the fans 52. The heater box is provided with an outlet 93 which corresponds to the aforementioned outlet 58 of the fan chamber 48. Within the heater box 88 there is provided a mounting member 94 which supports the heater elements 54 in a staggered one up, two down array. The heater elements 54 extend substantially across the full width of the heater box 88. The heater box 88 includes a floor 96 (not shown in FIG. 3) and a two part lid 98,100. In use, sealing means such as, for example, metallised tape is used to seal any small gaps around the edges of the lid 98,100. The sealing of such gaps ensures that the vast majority of the air directed into the heater box 88 by the fans 52 passes over the heater elements 54 and out of the outlet 93.

The speed of each fan 52 is independently controllable via a dedicated voltage potentiometer. The speed of each fan 52 is independently controllable so as to ensure a uniform distribution of heated air is circulated around and within the heated space 30. The scroll effect of the blades of each fan 52 has the effect of delivering air to the respective fan outlet which is directed slightly to one side. To counter the scroll effect each fan 52 may be operated a slightly different speed to the other. The fan voltage potentiometers also ensure that the airflow speed over the heater elements 54 is optimised so that the maximum amount of heat energy is transferred to the airstream. The optimised speed of the fans 52 is variable depending upon external ambient conditions.

The heater elements 54 may comprise finned ceramic heaters having an output of between 500 and 2000 watts. Depending upon such factors as, for example, the ambient temperature surrounding the cabinet 10, the initial temperature of the food products it is intended to place within the cabinet 10, and the anticipated length of time for the food products on display, the heater elements may be operated such that a temperature within the heated space 30 of between 60 to 90 degrees Celsius is maintained. It will be appreciated that the thermal output of the heater elements 54 is related to the output airflow of the fans 52. For example, the greater the airflow the higher the thermal output that may be required in order to provide a desired temperature within the heated space 30.

Operation of the cabinet 10 will now be described. In use, the fans 52 are operated to draw relatively cool air through the soffit panel louvres 56 and into the fan chamber 48 as indicated by arrows 60. Upon initial start-up of the cabinet 10 it will be appreciated the air drawn into the fan chamber 48 is at ambient temperature, while during normal operation of the cabinet 10, where heated air is circulated in the manner described below, the air will be at a temperature above that of ambient. The air is accelerated by the fans 52 and passes over the heating elements 54 before exiting the fan chamber 48 via the outlet 58. The heated air stream subsequently impinges upon the rear wall 18 and is directed downwardly as indicated by arrows 62 along a path defined between the rear wall 18 and the rear of the shelf brackets 40. As the heated air travels downwardly along the rear wall 18, portions thereof split away and spill into the heated space 30 over and around the shelves 38 and over the tray 44 as indicated by arrows 64. The natural tendency of the heated air to expand causes the aforementioned portions thereof to spill into the heated space 30. The temperature of the heated air is at its greatest as it leaves the heater box 88 and enters the heated space 30. By causing a portion of the heated air to spill into the heated space 30 as the heated air travels down the rear wall 18 it will be appreciated that the heat energy imparted to the air by the heater elements 54 is conveyed to the vicinity of food products within the heated space 30.

The remaining heated air, upon reaching the base wall 22 is directed through the space 46 under the tray 44 as indicated by arrows 66. Due to the natural buoyancy of the heated air, small amounts thereof rise upwardly through the perforations of the tray 44 as indicated by arrows 68. The remaining heated air subsequently reaches the front wall upper portion 26b whereupon it is redirected upwards and into the heated space 30. A portion of this heated air is directed towards the louvres 56 so as to provide a heated air curtain extending between the front wall upper portion 26b and the louvres 56 as indicated by arrows 70. The remainder of the heated air is directed towards the shelves 38 as indicated by arrows 72 whereupon it mixes with air spilling over and around the shelves from the airstream travelling down the rear wall 18 as indicated by arrows 74. The air curtain 70 prevents relatively cool air, indicated by arrows 76, which is external to the cabinet 10 from entering the heated space 30 and thereby lowering the temperature of the heated space 30.

The operation of the cabinet 10 may be considered to comprise the steps of compression of cooler air by the fans 52, heating of the compressed air by the heater elements 54 and the subsequent expansion of the heated air into the heated space 30.

The redirection of the heated air from the space 46 below the tray 44 back into the heated space 30 as described above is achieved by the use of an angled lip 78 provided upon the upper edge of the upper portion of the front wall 26b. The lip 78 extends across the upper portion of the front wall 26b between the side walls 20. The lip 78 is angled inwardly with respect to the heated space 30. The inclination of the lip 78 is chosen such that air is neither directly expelled from the cabinet 10 nor deflected out of the cabinet 10 by the lower shelves 38, situations which can occur if the lip angle is either too shallow or too steep. In the embodiment shown the lip 78 is inclined to the vertical at an angle of around 15 degrees. The cabinet 10 utilises the natural ability of the heated air to rise in order to promote the circulation of heated air around and through the shelves 38 and around food products supported thereon.

Circulation of heated air within the chamber 10 is also assisted by the configuration of the shelves 38. Each shelf 38 is provided at its forward edge with a ticket strip 80 upon which product pricing and labelling information can be attached. The ticket strip 80 is further configured to act in the manner of a spoiler or similar aerodynamic aid which directs heated air which impinges upon it. The heated air is directed upwardly and towards the rear of the heated space as indicated by arrows 82. For optimum efficiency the strip 80 is inclined at a predetermined angle to the upper surface 84 of the product support member 42. In the embodiment shown the ticket strip 80 is inclined at an angle of 35 degrees.

The shelves 38 may be configured such that the product support member 42 can be set and maintained at one of a range of inclination angles. For example the product support member 42 may be set at one of three positions corresponding to a flat position, where the shelf is substantially parallel to a reference plane such as the surface upon which the cabinet 10 is provided, and two inclined positions which are inclined with regard to the reference plane. For example, the support member 42 may be inclined at angles of 10 and 20 degrees to the reference plane. The ticket strip 80 is arranged on each shelf 38 such that the required inclination angle thereof relative to the upper surface 84 of the support member 42 is maintained irrespective of the inclination angle of the support member 42 relative to the reference plane.

Figure 5:
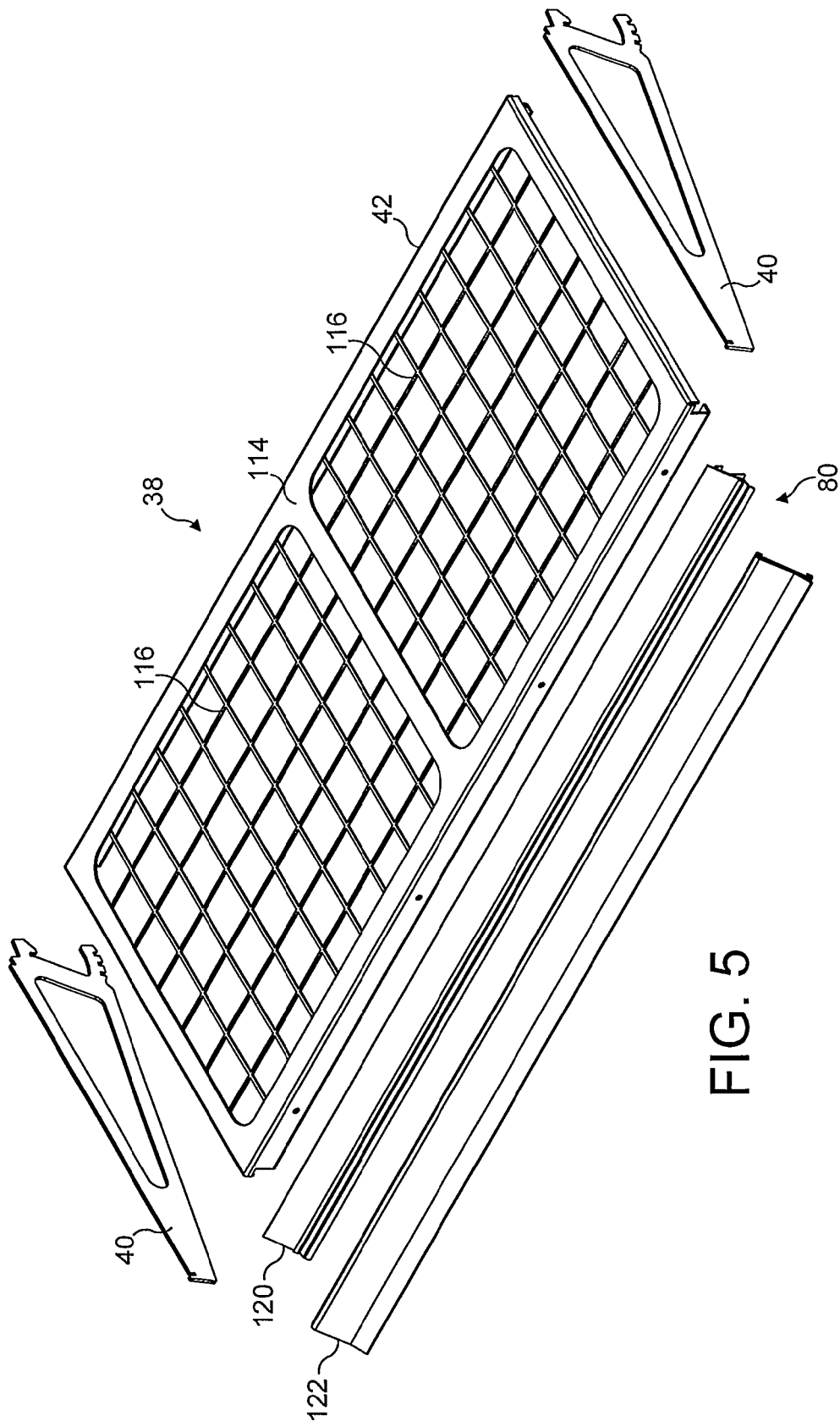
FIG. 5 shows an exploded view of a shelf of the cabinet.
Figure 6:
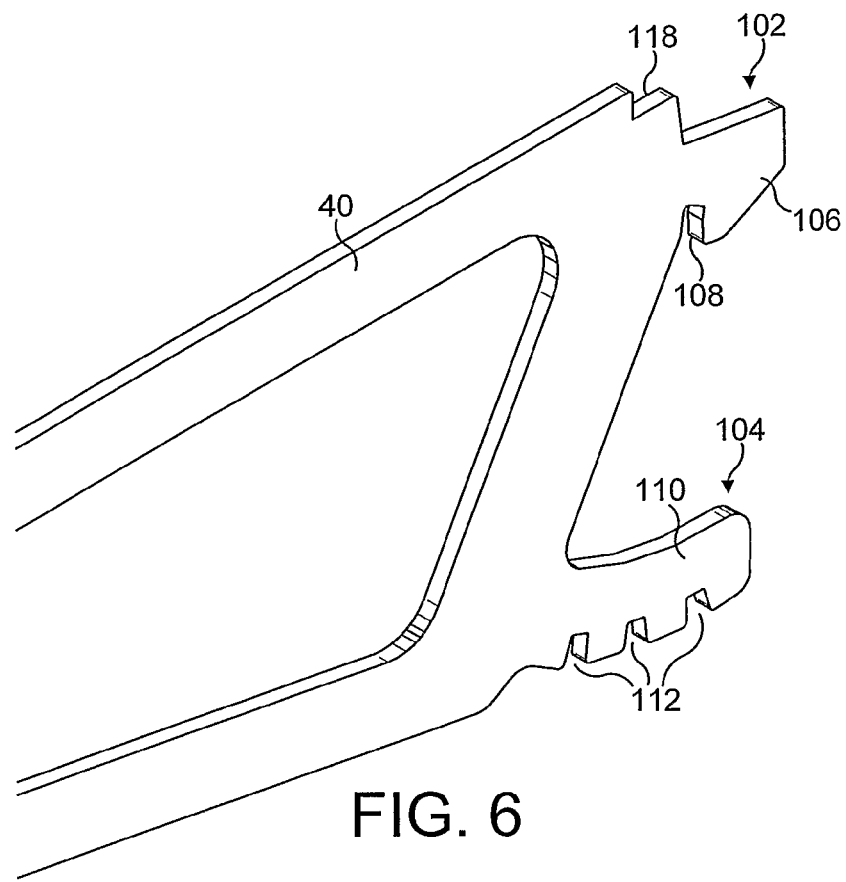
FIG. 6 shows a partial perspective view of a shelf bracket.
Figure 7:
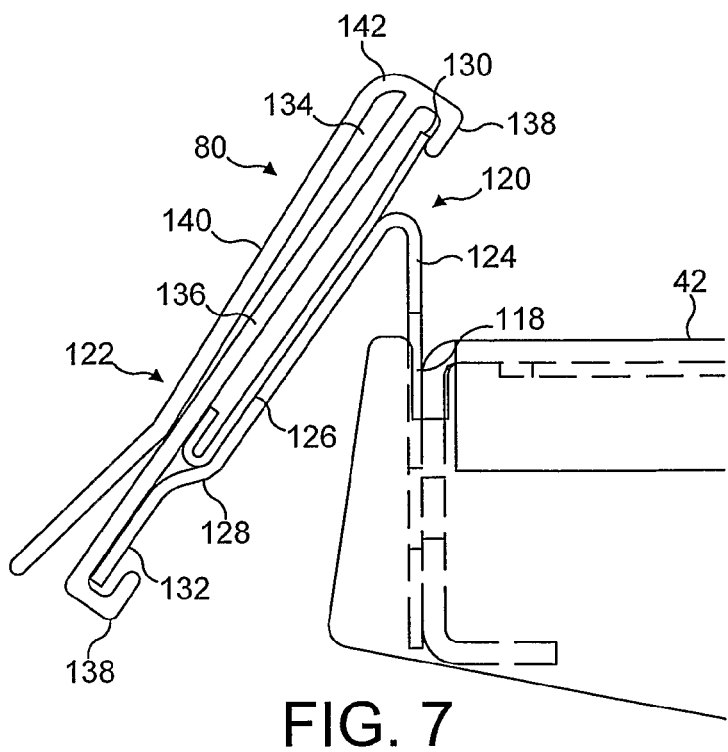
FIG. 7 shows a side view of a shelf ticket strip.

Referring now to FIGS. 5,6 and 7, the construction of a shelf 38 is shown in greater detail. Each bracket 40 is substantially triangular and is provided with upper and lower attachment formations 102,104 which enable the bracket 40 to be fitted to appropriately configured mounting sites if the cabinet 10. The upper attachment formation 102 is in the form of a hook 106 which is received in a slot of the cabinet 10. The hook 106 includes a recess 108 into which an edge of the slot is received, in use. The lower attachment formation 104 takes the form of curved projection 110 having a plurality of spaced recesses 112. The projection 110 is received in a slot of the cabinet 10. In a similar manner to the hook 106, an edge of the lower mounting member receiving slot is received in one of the recesses 112 of the projection 110. It will be understood that the inclination angle of the bracket 40, and hence the support member 42 is dependent upon which of the projection recesses 112 receives the edge of the slot.

The product support member 42 comprises a frame 114 having portions of wire mesh 116 attached thereto. The edges of the frame 114 are folded and the brackets 40 are provided with formations 118 arranged to receive the folded edges. The ticket strip 80 comprises a substantially rigid portion 120 and a flexible portion 122. The rigid portion 120 comprises a leg 124 which is attachable to the product support member 42 and a support strip 126 for the flexible portion 122 which is inclined relative to the leg 124. The support strip 126 comprises an extension 128 of the leg 124 with a further strip 130 of material attached thereto. The flexible portion 122 is formed form an extruded strip of plastics material and includes an attachment recess 132 and a ticket receiving recess 134. The attachment recess 132 is defined by a central wall 136 of the flexible portion which is provided on opposing edges with lips 138. The ticket receiving recess 134 is defined between a the central wall 136 and a flap 140 connected thereto by a living hinge 142. In use, the living hinge 142 is provided along the top edge of the ticket strip 80 so as to prevent the ingress of grease, oil or other matter into the ticket receiving recess 134. The flexible portion 122 is removable from the rigid portion 120 for cleaning purposes or in instances where the flexible portion 122 needs to be replaced or renewed.

A control panel 86 for the cabinet 10 is provided in the enclosed space 28 of the base portion 12. The control panel 86 is arranged to permit an operator set the operating parameters of the cabinet. More specifically the control panel 86 permits an operator of the cabinet 10 to set the temperature at which the heated space 30 is maintained.

The control panel 86 is provided with a fan motor cut-off timer which allows the fans 52 to continue to run for a predetermined time period once the heater elements 54 have been switched off, for example when the cabinet 10 is switched off at the end of the day. The overrunning of the fans 52 increases the service life of the fans 52 by reducing latent heat build up. The overrunning of the fans 52 also leads to a quicker cooling of the heated space 30 after shut down of the cabinet 10 which in turn permits daily cleaning of the cabinet to be carried out more quickly.

The control panel 86 is further provided with an over temperature safety cut-out system which is arranged to detect abnormal rises in temperature of the cabinet 10. If such a temperature rise is detected than the system cuts all power to the cabinet 10. Abnormal temperature rises may be caused by, for example, failure of one or both fans 52 or an malfunction of the heater elements 54.

The control panel 86 is provided with an electronic temperature controller to regulate the temperature within the heated space 30. The temperature within the heated space 30 is sensed by a thermocouple which is located in the downwardly directed heated air flow path at the rear of the cabinet 10. The thermocouple is provided with appropriate shielding so as not to be effected by external factors which may adversely affect the operation of the thermocouple and hence cause it to give a false reading of the temperature of the heated space 30. Such external factors may include, for example, draughts of cold air.

It will be understood that the cabinet 10 is not intended to heat food products from cold, but instead is intended to retard the cooling of heated food products which are placed in the heated space 30. Upon initial start up the cabinet 10 is operated to bring the heated space 30 up to the required temperature before heated food products are place therein.

As indicated above, the speed of each fan 52 may be set and adjusted independently of the other via a dedicated voltage potentiometer 53 (one of which is shown in FIG. 1). This feature permits the characteristics of the air curtain to be altered. During initial installation and commissioning of the cabinet 10 it may be observed that the cabinet 10 is subject to an incident external airflow such as, for example, a draught, which may cause deflection of air curtain. The speeds of the fans 52 can be set such that the air curtain is able to resist the influence of the draught.

While the cabinet 10 described above is provided with a substantially uniform and uninterrupted rear wall 18, an alternative embodiment of the cabinet 10 may be provided with a rear wall 18 having an access aperture such as a sliding door. The provision of a door of this type enables the cabinet to be replenished from the rear. It will further be appreciated that arrangements other than shelves 38 may be provided in the heated space 30. For example adjacent brackets 40 may be provided with one or more rods which extend across the heated space 30 and from which food products may be suspended. In an alternative embodiment the brackets 40 may be removed and replaced with a plurality of prongs which extend from the rear of the heated space 30 towards the open front 32 of the cabinet 10. The prongs may be utilised to suspend food products in bags.

The present invention seeks to retard the cooling of heated food products placed within the heated space 30. The retarded cooling effect is realised by surrounding the food products with a controlled heated air environment and by preventing the food products from being subjected to draughts and the like. It will be appreciated that the cabinet of the present invention does not seek to heat the food products by surface conduction or radiation. The shelves or other product support means, as well as the walls of the cabinet, are not heated by conduction and/or radiation and hence are not heated to a temperature which may potentially be harmful to person retrieving a product from the heated space. It will further be appreciated that the presence of the air curtain across the open front of the cabinet prevents the escape of heated air from within the heated space.

The invention claimed is:

1. A heated food storage and display cabinet using heated air for the warming of food packs included therein, the cabinet comprising:
   a chamber having an open front, a rear wall and a floor, said chamber having an air flow route extending down said rear wall and across said floor toward said open front;
   an inwardly angled lip mounted proximate said open front and said floor;
   a heating element disposed above said chamber; and
   a flow inducer disposed proximate said heating element, said flow inducer configured to propel air through said heating element and along said air flow route so as to coact with said inwardly angled lip to provide a heated air curtain extending upwardly across at least a portion of said open front,
   wherein a portion of said air heated by said heating element passes into said chamber as said heated air moves down said rear wall and across said floor so as to pass over and around packs of food stored therein.

2. A cabinet as claimed in claim 1, wherein said flow inducer comprises a plurality of fans situated in an upper portion of the chamber.

3. A cabinet as claimed in claim 2, wherein said plurality of fans are provided in a side by side arrangement.

4. A cabinet as claimed in claim 2, wherein said plurality of fans each include a corresponding fan outlet and said heating element is positioned at said corresponding fan outlet.

5. A cabinet as claimed in claim 2, wherein said plurality of fans are operable independently of one another.

6. A cabinet as claimed in claim 2, wherein said plurality of fans and said heating element are provided in a fan chamber situated in an upper portion of said chamber.

7. A cabinet as claimed in claim 6, wherein said fan chamber is provided with an inlet arranged to receive air from within said chamber and an outlet arranged to direct the heated air towards said rear wall.

8. A cabinet as claimed in claim 1, wherein said chamber includes opposing side walls and said inwardly angled lip extends between said opposing side walls.

9. A cabinet as claimed in claim 8, wherein said inwardly angled lip comprises a member extending between said opposing side walls, said member being inclined inwardly with respect to said chamber.

10. A cabinet as claimed in claim 9, wherein said member is inclined inwardly at an angle of between 10 to 20 degrees to the vertical.

11. A cabinet as claimed in claim 10 wherein said member is inclined inwardly at an angle of around 15 degrees to the vertical.

12. A cabinet as claimed in claim 1, wherein the cabinet is provided with a shelf arranged to support one or more food products within the chamber.

13. A cabinet as claimed in claim 12, wherein the inclination of the shelf is variable.

14. A cabinet as claimed in claim 12, wherein the shelf includes an airflow redirection means along its forward edge.

15. A cabinet as claimed in claim 14 wherein the airflow redirection means is defined by a member extending along a forward edge of the shelf.

16. A cabinet as claimed in claim 15 wherein said airflow redirection means is formed integrally with a display member provided on the forward edge of the shelf.

17. A cabinet as claimed in claim 16 wherein said display member includes an attachment portion and an information display portion.

18. A cabinet as claimed in claim 17 wherein the information display portion comprises a recess provided between a base and a cover overlying the base, the cover being joined to the base by a living hinge.

* * * * *